(12) United States Patent
Razavi et al.

(10) Patent No.: US 6,218,330 B1
(45) Date of Patent: Apr. 17, 2001

(54) PROCESS FOR PREPARING AND USING A SUPPORTED METALLOCENE-ALUMOXANE CATALYST

(75) Inventors: Abbas Razavi, Mons; Guy Debras, Les Bons Villers, both of (BE)

(73) Assignee: Fina Research, S. A., Feluy (BE)

( * ) Notice: Subject to any disclaimer, the term of this patent is extended or adjusted under 35 U.S.C. 154(b) by 0 days.

(21) Appl. No.: 09/296,034

(22) Filed: Apr. 21, 1999

Related U.S. Application Data

(63) Continuation of application No. 08/765,761, filed on Aug. 4, 1997, and a continuation of application No. PCT/EP96/01941, filed on May 9, 1996.

(51) Int. Cl.$^7$ ................................................. B01J 31/00
(52) U.S. Cl. ..................... 502/107; 502/108; 502/104; 502/116; 502/152; 502/235; 502/238; 526/160; 526/943
(58) Field of Search ..................... 502/107, 108, 502/152, 104, 116, 235, 238; 526/160, 943

(56) References Cited

U.S. PATENT DOCUMENTS 4,933,403 * 6/1990 Kaminsky et al. .................. 526/160
5,057,475 * 10/1991 Canich et al. ...................... 502/104

* cited by examiner

Primary Examiner—David W. Wu
Assistant Examiner—Ling-Siu Choi
(74) Attorney, Agent, or Firm—Jim D. Wheelington

(57) ABSTRACT

A process for the preparation of supported metallocene-alumoxane catalysts comprising the steps of:
   a) reacting a metallocene with an alumoxane at a temperature comprised between 15 and 50° C.,
   b) recovering a mixture comprising an alkylmetallocenium cation and an anionic alumoxane oligomer,
   c) reacting said mixture with a support, and
   d) recovering a supported metallocene-alumoxane catalyst as a dry solid, the reaction with the support being carried out at a temperature comprised between 85° C. and 110° C., preferably between 90 and 130° C., and their use for the polymerization or copolymerization of olefins.

16 Claims, 4 Drawing Sheets

PROCESS FOR PREPARING AND USING A SUPPORTED METALLOCENE-ALUMOXANE CATALYST

This is a Continuation application of co-pending application Ser. No. 08/765,761 filed Aug. 4, 1997 and a continuation of PCT/EP96/0194, filed May 9, 1996.

FIELD OF THE INVENTION

The present invention relates to a new process for preparing supported metallocene-alumoxane catalysts and their use in the polymerization or copolymerization of olefins.

DESCRIPTION OF THE PRIOR ART

Olefin (co)polymerization catalysts comprising a metallocene and an alumoxane have been known for a long time. European patent application no. 0 035 242 discloses a process for preparing ethylene and atactic propylene polymers in the presence of a halogen free cyclopentadienyl transition metal salt and an alumoxane.

The use of the homogeneous metallocene-alumoxane catalyst systems in the continuous olefin polymerization processes leads to several drawbacks. Indeed it invariably causes severe reactor wall fouling and crust formation, and further the resulting polymers are very fluffy and exhibit very low bulk densities.

In order to solve these problems, it was proposed to work with heterogeneous metallocene-alumoxane catalyst systems. For example these supported metallocene-alumoxane catalysts are described in European patent no. 0 619 325.

Known methods for preparing supported metallocene-alumoxane catalysts are disclosed in Makromol. Chem., Rapid Commun. 14, 239–243, 1993 (W. Kaminsky).

None of the above-mentioned patents and article reports about successful use (high activity, absence of reactor fouling) of any supported metallocene-alumoxane catalyst for the polymerization or copolymerization of olefins.

U.S. Pat. No. 5,240,894 relates to a process for producing a supported metallocene-alumoxane catalyst comprising forming an alumoxane-metallocene reaction solution, adding a porous support, evaporating the resulting slurry so as to remove residual solvent from the support and optionally prepolymerizing the catalyst with olefinic monomer. According to the description it is mentioned that the temperature maintained during reaction of the metallocene/alumoxane solution and support can be vary such as, for example, from 0° C. to 100° C. However all the examples given mention reaction mixtures heated at temperatures not higher than 66° C. Experiments were carried out by the Applicant and showed that when the contact between the metallocene/alumoxane and the support is made at the temperatures exemplified the efficiency catalyst of the so obtained supported catalytic system in the polymerization or copolymerization of olefins is not sufficiently high for an industrial application and yet an important reactor fouling is formed.

SUMMARY OF THE INVENTION

One of the aims of the present invention is consequently to overcome the above-mentioned drawbacks and to provide a process for preparing a supported metallocene-alumoxane catalyst having a surprisingly high activity and low reactor fouling.

To this end, according to the present invention, said process which comprises the following steps:

a) reacting a metallocene with an alumoxane at a temperature comprised between 15 and 50° C., b) recovering from step a) a mixture comprising an alkylmetallocenium cation and an anionic alumoxane oligomer, c) reacting said mixture with a support, and d) recovering a supported metallocene-alumoxane catalyst as a dry solid, is characterized in that the reaction of step c) is carried out at a temperature comprised between 85° C. and 110° C., preferably at a temperature comprised between 90 and 110° C., and most preferably at 110° C.

According to an advantageous embodiment of the invention, the duration of the reaction of step c) is between 60 and 120 minutes, preferably of about 90 minutes.

The invention also relates to a process for the polymerization or copolymerization of olefins comprising contacting at least one olefinic monomer in the presence of a supported catalyst thus obtained.

DETAILED DESCRIPTION OF THE INVENTION

Figure 1:
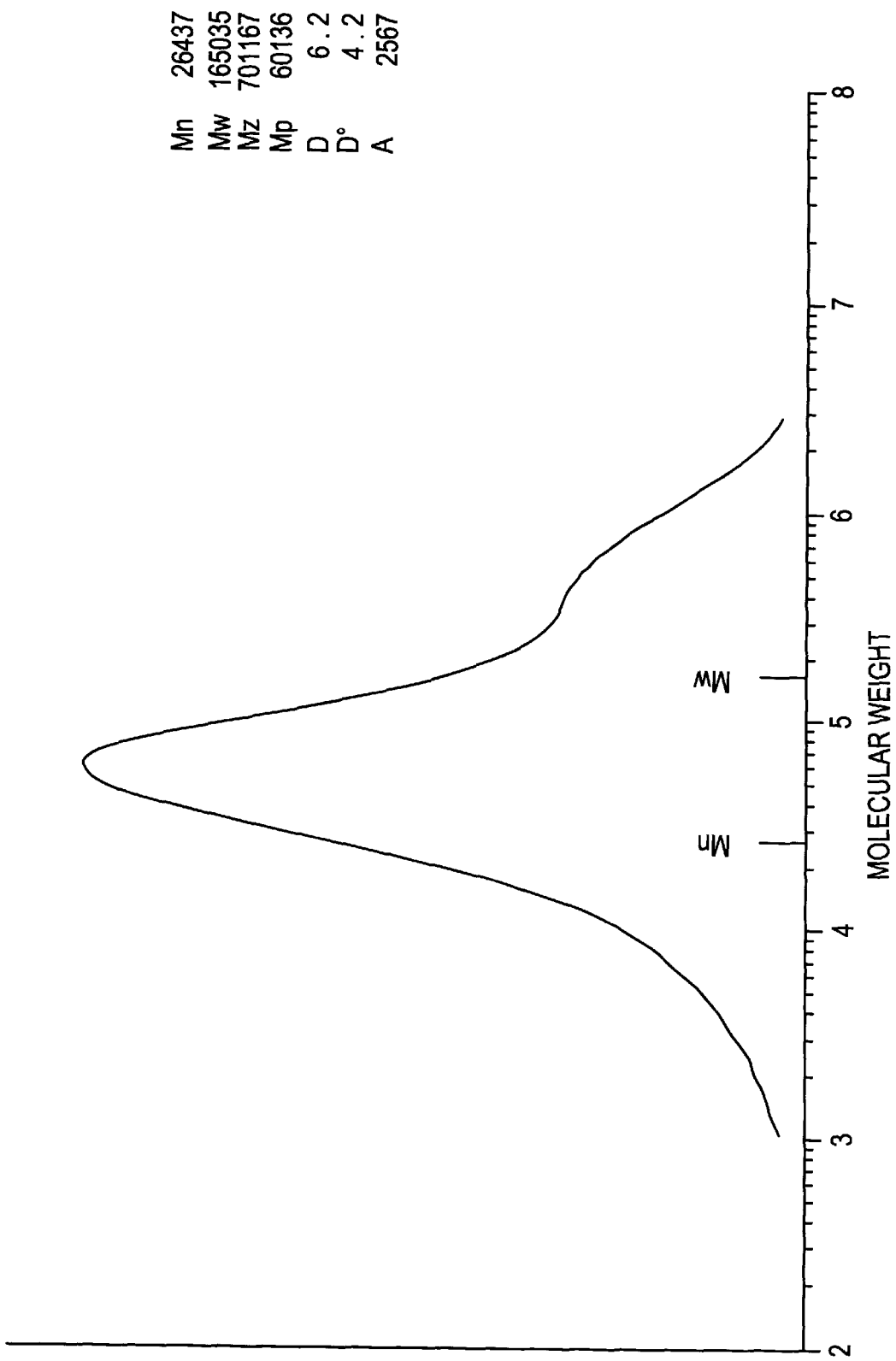
FIG. 1 is a Gel Permeation Chromatography (GPC-WATERS MILLIPORE) graph of the polymer of Example 11.

Further details and features of the invention will be evident from the description given below by way of a non-limiting example of several particular embodiments of the invention.

As has already been indicated above, the supported metallocene-alumoxane catalysts of the invention are obtained by a) reacting a metallocene with an alumoxane at a temperature comprised between 15 and 50° C., b) recovering from step a) a mixture comprising an alkylmetallocenium cation and an anionic aluminoxane oligomer, c) reacting said mixture with a support, and d) recovering a supported metallocene-alumoxane as a dry solid, the reaction between the mixture metallocene-alumoxane and the support being conducted at a temperature comprised between 85° C. and 130° C., preferably between 90 and 110° C., most preferably at about 110° C. The duration of said reaction is generally from about 1 to 2 hours, preferably of the order of 90 minutes.

Any metallocene in the art known as suitable for the polymerization of olefins can be used in the present invention.

Preferred metallocenes including isomerisable metallocenes which can be racemic or not, are represented by the general formulae:

$$(Cp)_m MR_n X_q \qquad (I)$$

wherein Cp is a cyclopentadienyl ring, M is a "Group IVB, VB or VIB" transition metal, R is a hydrocarbyl or hydrocarboxy group having from 1 to 20 carbon atoms, X is a halogen, and m=1–3, n=0–3, q=0–3 and the sum of m+n+q will be equal to the oxidation state of the metal.

$$(C_5R'_k)_g R''_s (C_5R'_k) MQ_{3-g} \quad (II)$$

and $$R''_s (C_5R'_k)_2 MQ' \quad (III)$$

wherein $(C_5R'_k)$ is a cyclopentadienyl or substituted cyclopentadienyl, each R' is the same or different and is hydrogen or a hydrocarbyl radical such as alkyl, alkenyl, aryl, alkylaryl, or arylalkyl radical containing from 1 to 20 carbon atoms or two carbon atoms are joined together to form a $C_4$–$C_6$ ring, R" is a $C_1$–$C_4$ alkylene radical, a dialkyl germanium or silicon or siloxane, or an alkyl phosphine or amine radical bridging two $(C_5R'_k)$ rings, Q is a hydrocarbyl radical such as aryl, alkyl, alkenyl, alkylaryl, or arylalkyl radical having from 1–20 carbon atoms, hydrocarboxy radical having 1–20 carbon atoms or halogen and can be the same or different from each other, Q' is an alkylidene radical having from 1 to about 20 carbon atoms, s is 0 or 1, g is 0, 1 or 2, s is 0 when g is 0, k is 4 when s is 1 and k is 5 when s is 0, and M is as defined above.

Exemplary hydrocarbyl radicals are methyl, ethyl, propyl, butyl, amyl, isoamyl, hexyl, isobutyl, heptyl, octyl, nonyl, decyl, cetyl, 2-ethylhexyl, phenyl and the like. Exemplary halogen atoms include chlorine, bromine, fluorine and iodine and of these halogen atoms, chlorine is preferred. Exemplary hydrocarboxy radicals are methoxy, ethoxy, propoxy, butoxy, amyloxy and the like. Exemplary of the alkylidene radicals are methylidene, ethylidene and propylidene. Among these one can cite isopropylidene (cyclopentadienyl fluorenyl) (zirconium dichloride), diphenyl methylidene (cyclopentadienyl fluorenyl) (zirconium dichloride), (biscyclopentadienyl) (zirconium dichloride), and (bismethylcyclopentadienyl) (zirconium dichloride).

More preferred metallocenes including isomerisable metallocenes which can be racemic or not, are selected from bisindenyl compounds having the following formula:

$$(Ind)_2 R'' MQ_2 \quad (IV)$$

wherein Ind is an indenyl or a substituted indenyl, R" is a $C_1$–$C_4$ alkylene radical, a dialkyl germanium or silicon or siloxane, or an alkyl phosphine or amine radical bridging the indenyls, Q is a hydrocarbyl radical such as aryl, alkyl, alkenyl, alkylaryl, or aryl alkyl radical having from 1–20 carbon atoms, hydrocarboxy radical having 1–20 carbon atoms or halogen and can be the same or different from each other, and M is Ti, Zr of Hf. Among these one can cite (bisindenyl) ethane (zirconium dichloride), (bisindenyl) ethane (hafnium dichloride), and dimethylsilyl (bisindenyl) (zirconium dichloride).

The term "isomerisable" means herein that the metallocene comprises different centres of chirality and has a flexible structure.

Any alumoxane known in the art can be used in the present invention.

The preferred alumoxanes comprise oligomeric linear and/or cyclic alkyl alumoxanes represented by the formulae:

for oligomeric, linear alumoxanes and

for oligomeric, cyclic alumoxanes,
wherein n is 1–40, preferably 10–20, m is 3–40, preferably 3–20 and R is a $C_1$–$C_8$ alkyl group and preferably methyl. Generally, in the preparation of alumoxanes from, for example, trimethyl aluminium and water, a mixture of linear and cyclic compounds is obtained. Methylalumoxane is preferably used. The alumoxane is usually delivered as a concentrated solution of alumoxane in toluene.

The support used in the present invention can be any organic or inorganic solids, particularly porous supports such as talc, inorganic oxides, and resinous support material such as polyolefin. Preferably, the support material is an inorganic oxide in its finely divided form.

Suitable inorganic oxide materials which are desirably employed in accordance with this invention include Group 2a, 3a, 4a or 4b metal oxides such as silica, alumina and mixtures thereof. Other inorganic oxides that may be employed either alone or in combination with the silica, or alumina are magnesia, titania, zirconia, and the like. Other suitable support materials, however, can be employed, for example, finely divided functionalized polyolefins such as finely divided polyethylene. Preferably, the support is a silica having a surface area comprised between 200 and 600 $m^2/g$ and a pore volume comprised between 0.5 and 4.5 ml/g.

The reaction between the metallocene and the alumoxane (step a) is a multi-step equilibrium type reaction involving mono- and di-alkylation of the metallocene, mono-, di- or multi-metallic species and finally abstraction of an alkyl group, and formation of active cationic species. The reaction between the metallocene and the alumoxane is performed at a temperature comprised between 15 and 50° C., preferably about 25° C. The reaction is usually conducted in the presence of a solvent, preferably toluene.

The amount of alumoxane and metallocene usefully employed in the preparation of the solid support catalyst can vary over a wide range. Preferably, the aluminium to transition metal mole ratio is comprised between 1:1 and 100:1, preferably between 5:1 and 50:1.

The order of addition of the support to the mixture comprising the alkylmetallocenium cation—anionic alumoxane oligomer can be reversed. However, the mixture alkylmetallocenium cation—anionic alumoxane oligomer is added to the support material slurried in a suitable hydrocarbon solvent. Suitable solvents include mineral oils and the various hydrocarbons which are liquid at temperature and pressure conditions and which do not react with the individual ingredients. Illustrative examples of the useful solvents include the alkanes such as pentane, iso-pentane, hexane, heptane, octane and nonane, cycloakanes such as cyclopentane and cyclohexane, and aromatics such as benzene, toluene, ethylbenzene, xylene and diethylbenzene, the preferred being toluene.

As above mentioned, the reaction between the support and the mixture alumoxane-metallocene is conducted at a temperature comprised between 85 and 130° C., preferably between 90 and 110° C., most preferably around 110° C. during a time period of 60 to 120 minutes, preferably of about 90 minutes.

Another advantage of the present catalyst besides its high efficiency and low fouling is the facility and rapidity with which it is prepared. Indeed the process of the invention does not require the time-consuming washing steps of the prior art; the final catalyst system is prepared within 1–2½ hours. Further it does not require the consumption of large amounts of solvent which is needed in the most prior art methods.

According to the present invention, there is also provided a process for the polymerization or copolymerization of olefins comprising contacting one or more olefinic monomers in the presence of a supported metallocene-alumoxane catalyst prepared according to such a process. When an isomerisable metallocene or an isomerisable racemic metallocene component is used bimodal olefin polymer or copolymers having a broadened molecular weight distribution with good processability, good physical properties and diverse applicability are obtained. As a matter of fact, broadening the molecular weight distribution is one way to improve the processing of high molecular weight polyolefins, in applications requiring fast processing at fairly high die swell, such as in blowing and extrusion techniques.

The catalyst prepared according to the present invention can be used in gas, solution or slurry polymerizations. The polymerization process is preferably conducted under slurry phase polymerization conditions. The slurry phase polymerization conditions comprise usually a temperature of about 20 to 125° C. and a pressure of about 0.1 to 5.6 MPa for a time between 10 minutes and 4 hours. It is preferred that the polymerization reaction be run in a diluent at a temperature at which the polymer remains as a suspended solid in the diluent. Diluents include, for example, isobutane, n-hexane, n-heptane, methylcyclohexane, n-pentane, n-butane, n-decane, cyclohexane and the like. A suitable diluent is isobutane.

Generally, a continuous reactor is used for conducting the polymerization. This continuous reactor is preferably a loop reactor. During the polymerization process, at least one monomer, the catalytic system and a diluent are flowed in admixture through the reactor. Hydrogen can be used. When used, it is preferred that the relative amounts of hydrogen and olefin introduced into the polymerization reactor be within the range of about 0.001 to 15 mole percent hydrogen and 99.999 to 85 mole percent olefin based on total hydrogen and olefin present, preferably about 0.2 to 3 mole percent hydrogen and 99.8 to 97 mole percent olefin. The olefinic monomer that is used in the process of the present invention to produce a polyolefin is preferably selected from ethylene and other higher alpha olefins, preferably olefins having from 3 to 10 carbon atoms including for example, 4-methyl-1-pentene. More preferably these olefins are selected from the group consisting of ethylene, propylene, hexene, and mixtures thereof, ethylene being the most preferred.

While alumoxane can be used as cocatalyst, it is not necessary to use alumoxane as cocatalyst during the polymerization procedure for preparing polyolefins according to the process of the present invention. Further, the use of alumoxane as a cocatalyst during the polymerization may lead to the fouling of the reactor. One or more aluminiumalkyl represented by the formula $AlR_x$ can be used, each R being the same or different and being selected from halides or from alcoxy or alkyl groups having from 1 to 12 carbon atoms and x is from 1 to 3. Especially suitable aluminiumalkyl are trialkylaluminium selected from trimethylaluminium, triethylaluminium, triisobutylaluminium, tri-n-octyl-aluminium or tri-n-hexylaluminium, the most preferred being triisobutylaluminium.

The invention will now be further described by the following non limiting examples.

EXAMPLES

1. Catalyst Preparation (Examples $A_1$ to $A_6$)

The support used is a silica having a total pore volume of 4.217 ml/g and a surface area of 322 m²/g. This silica is further prepared by drying in high vacuum on a schlenk line for three hours to remove the physically absorbed water. 5 g of this silica are suspended in 50 ml of toluene and placed in a round bottom flask equipped with magnetic stirrer, nitrogen inlet and dropping funnel.

An amount of 0.31 g of isomerisable metallocene is reacted with 25 ml of methylalumoxane (MAO 30 wt. % in toluene) at a temperature of 25° C. during 10 minutes to give a solution mixture of the corresponding metallocenium cation and the anionic methylalumoxane oligomer.

Then the resulting solution comprising the metallocenium cation and the anionic methylalumoxane oligomer is added to the support under a nitrogen atmosphere via the dropping funnel which is replaced immediately after with a reflux condenser. The mixture is heated to 110° C. for 90 minutes. Then the reaction mixture is cooled down to room temperature, filtered under nitrogen and washed with toluene.

The colour of the filtrate indicates if the fixation of the cation is quantitative. A colourless filtrate usually means a complete fixation. The catalyst obtained is then washed with pentane, dried under a mild vacuum and recovered as a solid dry free flowing powder. The type of metallocene, the temperature and the time period of the reaction between the mixture alumoxane-metallocene and the support, the colour of the filtrate and the amount of catalyst obtained are given in Table 1 hereafter.

2. Polymerization Procedure

Examples 1 to 10

Three minutes before the introduction of the catalyst into the reaction zone 1 ml of 25 wt. % of triisobutylaluminium (TIBAL) in toluene is added to the catalyst.

All polymerizations were performed in a four liters bench reactor. For the polymerization of ethylene the reactor contains two liters of isobutane as diluent (Examples 1 to 6, 9 and 10). For the polymerization of propylene, the diluent is propylene (Examples 7 and 8). The catalyst type, the polymerization conditions and the polymer properties are given in Table 2 hereafter. As indicated in Table 2, some examples include a prepolymerization step which consists of the introduction of the catalyst of 30° C. and a heating until the polymerization temperature.

TABLE 1

| Example | Silica (g) | Metallocene Type:isomerisable | (g) | MAO (ml) | T (°C.) | Time (min) | Filtrate | Catalyst (g) |
|---|---|---|---|---|---|---|---|---|
| A1 | 5 | Ind$_2$EtZrCl$_2$ | 0.31 | 25 | 110 | 90 | colourless | 8.2 |
| A2 | 5 | Ind$_2$(Me$_2$Si)ZrCl$_2$ | 0.31 | 25 | 110 | 90 | colourless | 10 |
| A3 | 5 | Ind$_2$EtZrCl$_2$ | 0.31 | 25 | 110 | 90 | colourless | 8.6 |
| A4 | 5 | Ind$_2$EtHfCl$_2$ | 0.31 | 25 | 110 | 90 | colourless | 7.5 |
| A5 | 5 | iPrCpFluZrCl$_2$ | 0.31 | 25 | 110 | 90 | colourless | 8.6 |
| A6 | 5 | Ph$_2$CCpFluZrCl$_2$ | 0.31 | 25 | 110 | 90 | colourless | 7.6 |

Ind$_2$EtZrCl$_2$ (bisindenyl) ethane (zirconium dichloride)
Ind$_2$(Me$_2$Si)ZrCl$_2$ dimethylsilyl (bisindenyl) ethane (zirconium dichloride)
Ind$_2$EtHfCl$_2$ (bisindenyl) ethane (hafnium dichloride)
iPrCpFluZrCl$_2$ isopropylidene (cyclopentadienyl fluorenyl) (zirconium dichloride)
Ph$_2$CCpFluZrCl$_2$ diphenyl methylidene (cyclopentadienyl fluorenyl) (zirconium dichloride)

In all examples, the mixture alkylmetallocenium cation-anionic alumoxane oligomer has been added to the support material except for Example A3 where the order of addition has been reversed.

TABLE 2

| Ex. | Catalyst (mg) | Catalyst Type | Prepoly-merization (yes/no/(C.°)) | Pres-sure (MPa) | Polymerization T (°C.) | Time (min) | Monomer Type | Monomer (wt %) | Hydrogen (Nl) | Hexene (wt %) | Yield (g) | Activity (g/g.h) | Bulk (1) | MI (2) | HLMI (3) |
|---|---|---|---|---|---|---|---|---|---|---|---|---|---|---|---|
| 1 | 100 | A.2 | NO | 2.2 | 80 | 60 | C2 | 6 | 0.25 | 2.44 | 301 | 3010 | 0.42 | 7.08 | 287.2 |
| 2 | 100 | A.2 | YES/30 | 2.2 | 80 | 60 | C2 | 6 | 0.5 | 2.44 | 506 | 5060 | 0.41 | 0.03 | 9.1 |
| 3 | 100 | A.2 | YES/30 | 2.3 | 90 | 60 | C2 | 6 | 0.25 | 1.22 | 490 | 4900 | 0.40 | 0.13 | 17.07 |
| 4 | 100 | A.2 | YES/30 | 2.3 | 90 | 60 | C2 | 6 | 0.5 | 1.22 | 488 | 4880 | 0.44 | 0.08 | 12.24 |
| 5 | 100 | A.3 | YES/30 | 2.3 | 90 | 60 | C2 | 6 | 0.25 | 1.22 | 430 | 4300 | 0.42 | ND | ND |
| 6 | 100 | A.4 | NO | 2.3 | 90 | 90 | C2 | 6 | 0.25 | 1.22 | 365 | 2433 | 0.42 | 3.57 | 113.2 |
| 7 | 100 | A.5 | YES/30 | 2.5 | 60 | 60 | C3 | 100 | 0 | 0 | 36 | 360 | ND | ND | ND |
| 8 | 100 | A.5 | YES/30 | 3.0 | 70 | 60 | C3 | 100 | 0 | 0 | 15 | 150 | ND | ND | ND |
| 9 | 100 | A.1 | NO | 2.4 | 70 | 60 | C2 | 6 | 0 | 0 | 160 | 1600 | 0.28 | 0.02 | 2.8 |
| 10 | 100 | A.2 | NO | 2.3 | 90 | 60 | C2 | 6 | 0 | 0 | 78 | 780 | 0.24 | 0.01 | 2.4 |

C$_2$: ethylene
C$_3$: propylene
(1) Bulk density (ASTM-D-1895)
(2) Melt Index (ASTM-D-1238-89A)
(3) High Load Melt Index (ASTM-D-1238-89A)

Examples 11 to 14

The polymerization is carried out slurry in a liquid full loop reactor. Ethylene is injected with 1-hexene together with the catalyst. Isobutane is used as diluent. The catalyst type, polymerization conditions and properties are indicated in Table 3.

Figure 2:
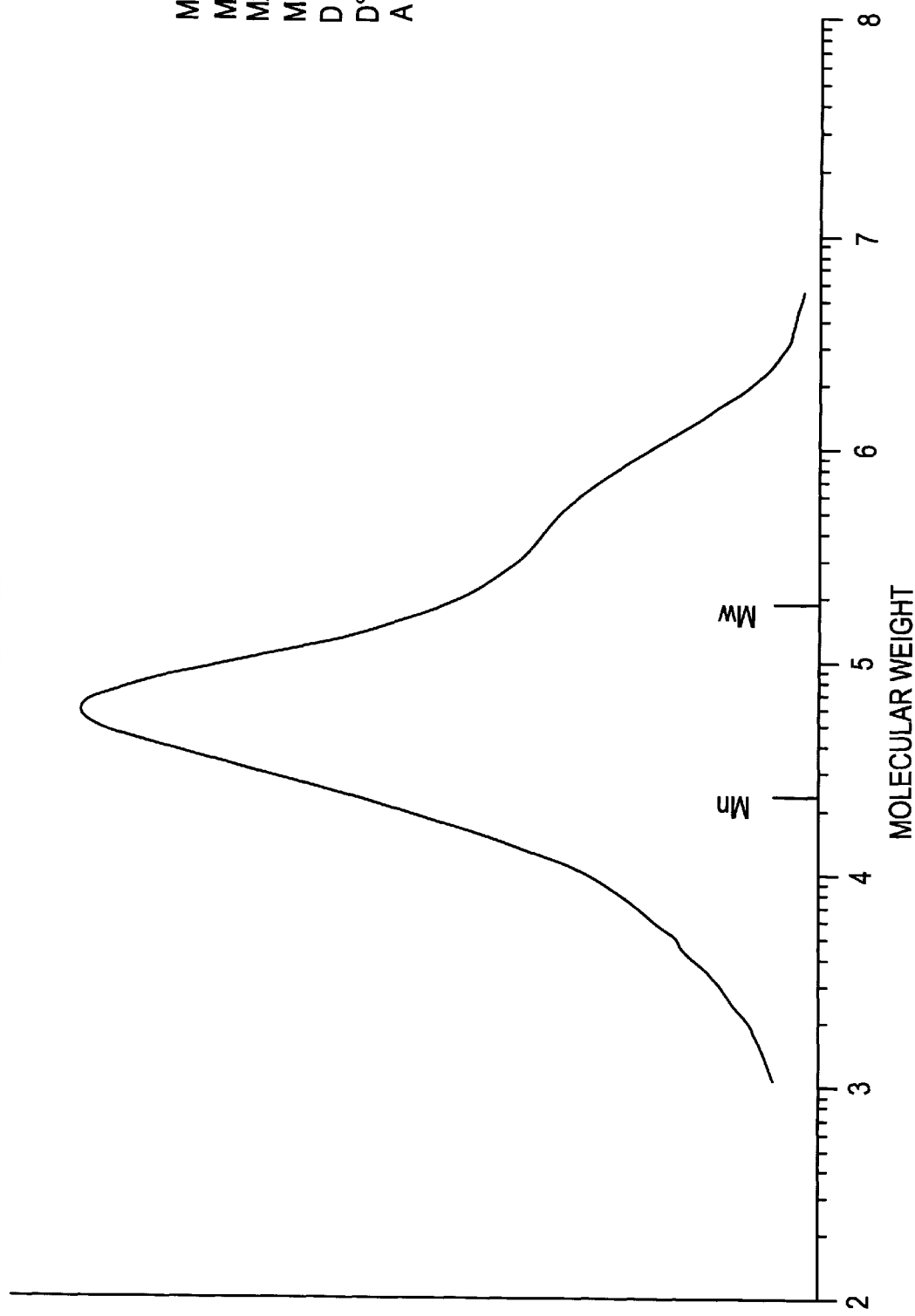
FIG. 2 is a Gel Permeation Chromatography (GPC-WATERS MILLIPORE) graph of the polymer of Example 12.
Figure 3:
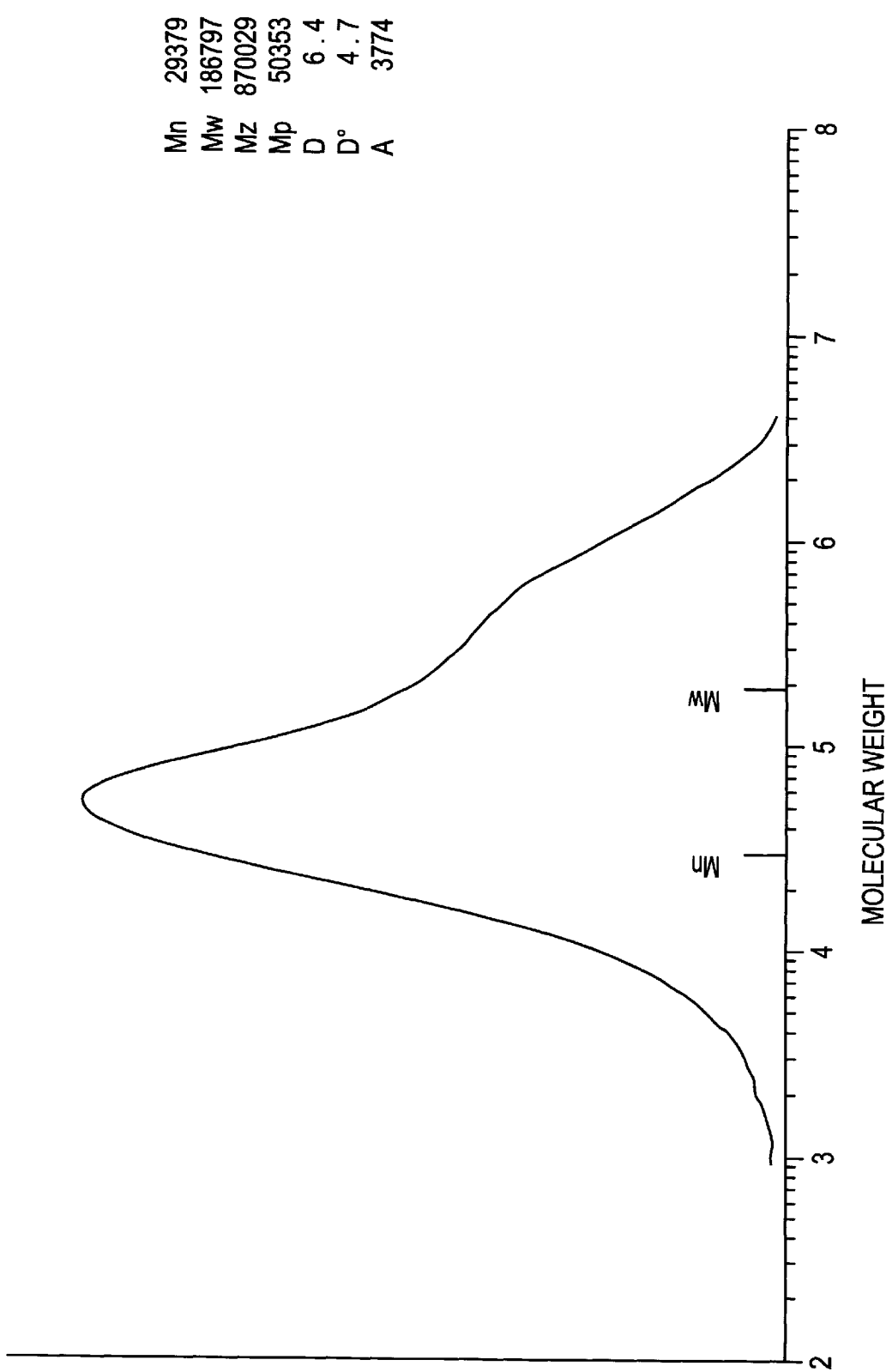
FIG. 3 is a Gel Permeation Chromatography (GPC-WATERS MILLIPORE) graph of the polymer of Example 13.
Figure 4:
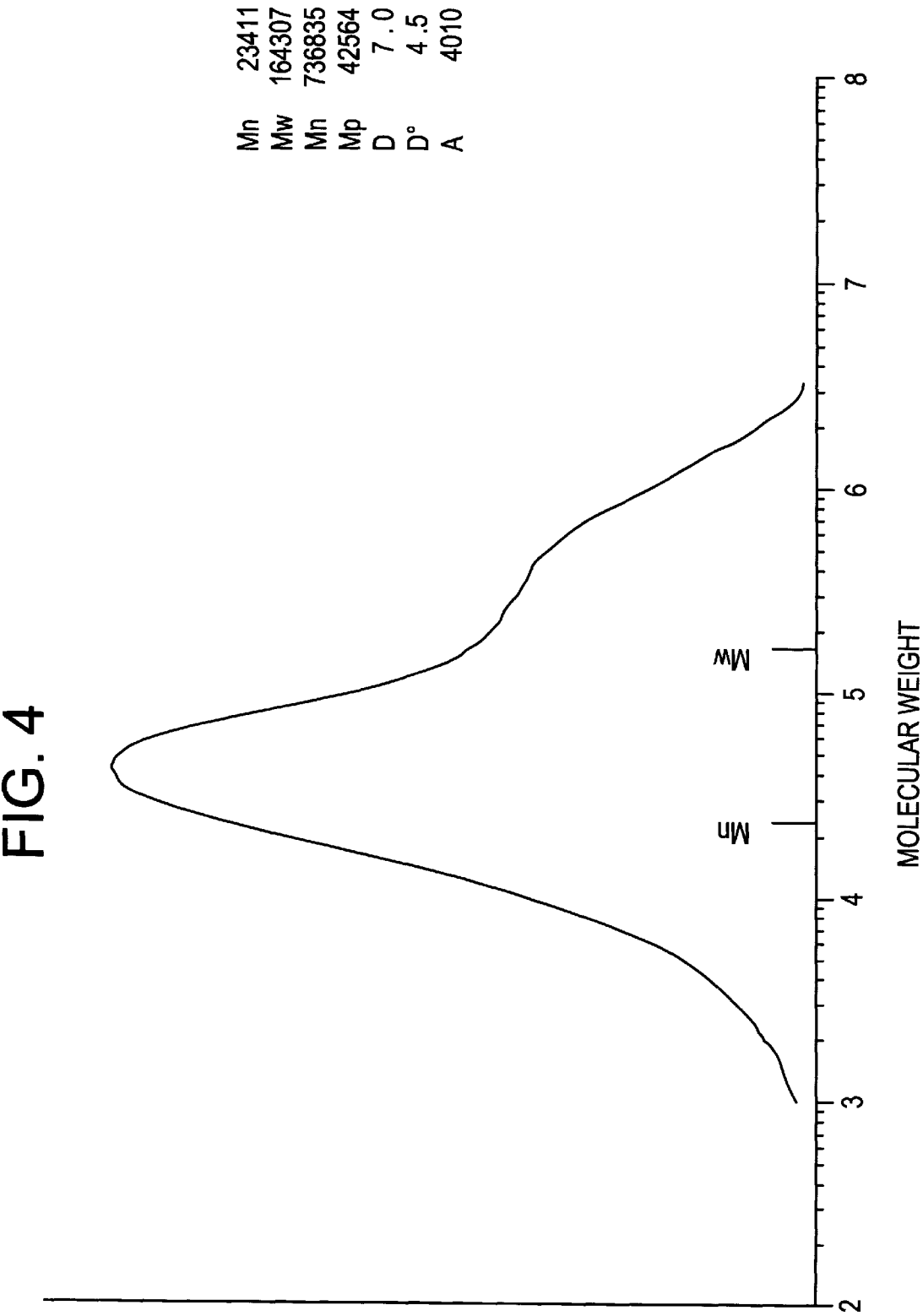
FIG. 4 is a Gel Permeation Chromatography (GPC-WATERS MILLIPORE) graph of the polymer of Example 14.

The polymers were analyzed by Gel Permeation Chromatography (GPC-WATERS MILLIPORE) and Differential Scanning Calorimetry (DSC). The graphs are given in FIGS. 1 to 4 respectively correspond to Examples 11 to 14 of Table 3). "D" represents the ratio Mw/mn (MWD), "D'" the ratio Mz/Mw and "A" the area under the curve.

TABLE 3

| Reactor | 11 | 12 | 13 | 14 |
|---|---|---|---|---|
| Catalyst (type) | A2 | A2 | A1 | A1 |
| Reactor Vol (1) | 70 | 70 | 70 | 70 |
| T (°C.) | 80 | 80 | 80 | 80 |
| C$_2^-$ (kg/h) | 5 | 4 | 8 | 7.5 |
| C$_6^-$ (cc/h) | 400 | 376 | 325 | 300 |
| H$_2$ (Nl/h) | 1.5 | 1.5 | 2 | 4 |
| iC$_4$ (kg/h) | 20 | 20 | 30 | 30 |
| PE resid. time (min) | 60 | 60 | 60 | 60 |
| TiBAL (ppm) | 200 | 200 | 400 | 400 |
| MI2 (g/10') | 0.02 | 0.035 | 0.053 | 0.14 |
| HLMI (g/10') | 3.93 | 5.5 | 7.7 | 16.3 |
| Density (g/cc) | 0.933 | 0.931 | 0.937 | 0.942 |
| Bulk density (g/cc) | 0.44 | 0.44 | 0.44 | 0.42 |
| MWD | 6.2 | 8.1 | 6.4 | 7.0 |

C$_2^-$: ethylene
C$_6^-$: 1-hexene
iC$_4$: isobutane
TiBAL: triisobutylaluminium
Bulk density (ASTM-D-1985)
MI2: Melt Index (ASTM-D-1238-89A)
HLMI : High Load Melt Index (ASTM-D-1238-89A)

Examples 15 to 20

These examples (Table 4) show the surprising and very important role of the temperature of the reaction between the mixture metallocene/MAO and the support on the catalyst efficiency in the polymerization of ethylene. In Examples 15 to 18 (prior art) the reaction has been conducted at a temperature from 20 to 70° C. during time periods from 2 hours to about 48 hours, thug within the range of the temperatures cited in the examples of U.S. Pat. No. 5,240, 894 and in Examples 19 and 20 (invention) at 90° C., a temperature according to the present invention. As shown the activity of the catalyst of Example 19 is substantially the same as for Examples 15 to 18 but for a time period twice as short whereas the activity of the catalyst of Example 19 is substantially higher. Further in the examples of the prior art important fouling is formed in the reactor.

TABLE 4

| Example | MAO (ml) | Ind$_2$EtZrCl$_2$ (g)$^{(a)}$ | Addition order$^{(b)}$ | T (° C.) | Time (min) | Filtrate | Activity (g/g.h) | Fouling |
|---|---|---|---|---|---|---|---|---|
| 15 | 50 | 6.3 | (2 + tol) + 1 | 20 | 120 | yellow | 3000 | important |
| 16 | 50 | 6.3 | 1 + (2 + tol) | 20 | 2 days | yellow | 1380 | important |
| 17 | 50 | 6.3 | 1 + (2 + tol) | 60 | 120 | yellow | 1280 | important |
| 18 | 25 | 6.0 | 1 + 2 | 70 | 120 | pale yellow | 1560 | important |
| 19 | 25 | 6.3 | 1 + 2 | 90 | 60 | yellow | 1540 | weak |
| 20 | 25 | 6.3 | 1 + 2 | 90 | 120 | colourless | 5820 | weak |

$^{(a)}$Amount in wt % with reference to initial silica.
$^{(b)}$1: silica (Grace 955) + toluene
2: metallocene + MAO (30 wt % sln in toluene WITCO)
1 + 2: (silica/toluene) + (metallocene/MAO)
2 + 1: (metallocene/MAO) + (silica/toluene).

What is claimed is:

1. A process for the preparation of a supported metallocene-alumoxane catalyst comprising the steps of:
   a) reacting a metallocene with an alumoxane at a temperature comprised between 15 and 50° C. to form a mixture comprising an alkyl metallocenium cation and an anionic alumoxane oligomer,
   b) reacting the mixture from step a) with a support at a temperature comprised between 85° C. and 130° C.,
   c) recovering a supported metallocene-alumoxane catalyst as a dry solid,
wherein the metallocene is an isomerisable component and is represented by the following formulae:

$$(Cp)_m MR_n X_q$$

wherein Cp is a cylcopentadienyl ring, M is a Group 4b, 5b, or 6b transition metal, R is a hydrocarbyl or hydrocarboxy group having from 1 to 20 carbon atoms, X is a halogen, and m=1–3, n=0–3, g=0–3 and the sum of m+n+q will be equal to the oxidation state of the metal; or $$(C_5R'_k)_g R''_6 (C_5R'_k) MQ_{3-g}$$

or $$R''_s(C_5R'_k)_2 MQ'$$

wherein (C$_5$R'$_k$) is a cyclopentadienyl or substituted cyclopentadienyl, each R' is the same or different and is hydrogen or a hydrocarbyl radical containing from 1 to 20 carbon atoms, R" is a C$_1$–C$_4$ alkylene radical, a dialkyl germanium or silicon or siloxane radical, or an alkyl phosphine or amine radical bridging two (C$_5$R'$_k$) rings, Q is a hydrocarbyl radical having from 1–20 carbon atoms, a hydrocarboxy radical having 1–20 carbon atoms or a halogen and can be the same or different from each other, Q' is an alkylidene radical having from 1 to 20 carbon atoms, s is 0 or 1, g is 0, 1, or 2, s is 0 when g is 0, k is 4 when s is 1 and k is 5 when s is 0, and M is a group 4b, 5b or 6b transition metal.

2. A process according to claim 1 wherein said temperature is comprised between 90° C. and 110° C.

3. A process according to claim 2 wherein said temperature is of 110° C.

4. A process according to claim 1 wherein the duration of the reaction of step b) is between 60 and 120 minutes.

5. A process according to claim 4 wherein said ion is of about 90 minutes.

6. A process according to claim 1 wherein the isomerisable metallocene is a racemic component.

7. A process according to claim 1, wherein the metallocene is selected from bis-indenyl compounds having the formula:

$$(Ind)_2 R''MQ_2$$

wherein Ind is an indenyl or a substituted indenyl, R" is a C$_1$–C$_4$ alkylene radical, a dialkyl germanium or silicon or siloxane, or an alkyl phosphine or amine radical bridging the indenyls, Q is a hydrocarbyl radical such as aryl, alkyl, alkenyl, alkylaryl, or aryl alkyl radial having from 1–20 carbon atoms, hydro-carboxy radical having 1–20 carbon atoms or halogen and can be the same or different from each other, and M is Ti, Zr or Hf.

8. A process according to claim 7 wherein the metallocene is ethane (bisindenyl) zirconium dichloride, ethane (bisindenyl) hafnium dichloride, or dimethylsilyl (bisindenyl) zirconium dichloride.

9. A process according to claim 1 wherein the metallocene is isopropylidene (cyclopentadienyl fluorenyl) zirconium dichloride or diphenylmethylidene (cyclopentadienyl fluorenyl) zirconium dichloride.

10. A process according to claim 1 wherein the alumoxane is methylalumoxane.

11. A process according to claim 1 wherein the support is a silica having a surface area comprised between 200 and 600 m$^2$/g and a pore volume comprised between 0.5 and 4.5 ml/g.

12. A process according to claim 1 wherein the catalyst is recovered as a free flowing powder.

13. A process according to claim 1 wherein the metallocene is (biscyclopentadienyl) zirconium dichloride or (bismethyl cyclopentadienyl) zirconium dichloride.

14. A process according to claim 1 wherein the alkyl metallocenium cation and an anionic aluminoxane oligomer mixture is added to the support.

15. A process according to claim 14 wherein the support is slurried in a hydrocarbon solvent.

16. A process according to claim 15 wherein c) recovering a supported metallocene-alumoxane catalyst from the solvent as a dry solid.

* * * * *